United States Patent [19]
Cheu

[11] Patent Number: 5,674,641
[45] Date of Patent: Oct. 7, 1997

[54] BATTERY MODULE AND METHOD OF MAKING A BATTERY

[75] Inventor: Scot Stacey Cheu, San Jose, Calif.

[73] Assignee: Valence Technology, Inc., Henderson, Nev.

[21] Appl. No.: 968,368

[22] Filed: Oct. 29, 1992

[51] Int. Cl.⁶ ..................................................... H01M 6/18
[52] U.S. Cl. ........................ 429/192; 429/194; 429/218
[58] Field of Search ............................................... 429/192

[56] References Cited

U.S. PATENT DOCUMENTS

| | | | |
|---|---|---|---|
| 3,907,599 | 9/1975 | Fanciullo et al. | 429/152 |
| 4,119,770 | 10/1978 | Land | 429/152 |
| 4,150,200 | 4/1979 | Sullivan | 429/152 |
| 4,389,470 | 6/1983 | Plasse | 429/152 |

Primary Examiner—David B. Springer
Attorney, Agent, or Firm—Charles Jew

[57] ABSTRACT

A battery module includes a number of electrically connected electrochemical cells. In a preferred embodiment, the battery includes multi-cell batteries in which electrodes are separated from different potential electrodes by a layer of polymer electrolyte. The battery module is formed from a number of multi-cell batteries stacked on top of one another, the electrodes of each multi-cell being electrically connected to one another, and the different potential electrodes of each multi-cell being electrically connected to one another so that a battery module having desired power characteristics is formed. The battery module includes electrically conductive spacers for electrically connecting tabs on the electrodes to tabs on other electrodes and tabs on the different potential electrodes to tabs on other different potential electrodes and for preventing damage to the tabs or the electrodes or different potential electrodes from bending the tabs excessively.

10 Claims, 7 Drawing Sheets

BATTERY MODULE AND METHOD OF MAKING A BATTERY

BACKGROUND OF THE INVENTION

1. Field of the Invention

The present invention relates to batteries and, more particularly, the present invention relates to batteries of the type having a polymer electrolyte.

2. State of the Art

In recent years, individuals in the battery art have begun to understand the advantages of manufacturing batteries that have polymer electrolytes and sheet-like cathodes and anodes. The advantages include lower battery weight than batteries that employ liquid electrolytes, longer service life, relatively high power densities, relatively high specific energies, and the elimination of danger due to the spillage of acidic liquid electrolytes.

In fabricating batteries, it is generally necessary to connect an anode to an anode current collector and a cathode to a cathode current collector so that electric energy can be drawn from the battery by an external load. In multi-cell batteries, current collectors are generally connected to each anode and each cathode, and the current collectors connected to each anode are electrically connected together and the current collectors connected to each cathode are electrically connected together.

In batteries of the type that have a thin polymer electrolyte and sheet-like anode and cathode layers, it is common that a relatively large number of individual cells form a battery. The connection of separate current collectors to the individual anode and cathode layers of the cells can be quite troublesome. One problem is that relatively large numbers of current collectors must be provided. Further, means for attaching the current collectors to the anodes and cathodes must be provided. Further still, as the anode and cathode layers are generally quite thin, the current collectors and the means for attaching the current collectors must not be overly large or obtrusive such that they interfere with one another or with the formation of the battery.

SUMMARY OF THE INVENTION

The present invention, generally speaking, provides a battery that uses a polymer electrolyte in lieu of a liquid electrolyte to attain desired operating characteristics in a small, light-weight battery.

In accordance with one aspect of the present invention, an electrochemical cell includes a first electrode, a second electrode, and electrolyte material. The first electrode includes means for first electrode current collection, the first electrode current collection means being formed from a first conductive sheet, and a layer of first electrode material. The second electrode is of a different potential than that of the first electrode and includes means for second electrode current collection, the second electrode current collection means being formed from a second conductive sheet, and a layer of second electrode material. An electrolyte is coated on one of the first or second electrode materials and contacts with the other of the first or second electrode materials. An outer periphery of the first electrode is larger than an outer periphery of the second electrode such that substantially all of the outer periphery of the second electrode is bounded by the outer periphery of the first electrode.

In accordance with another aspect of the present invention, a multi-cell battery module includes a first electrode, a second electrode, a third electrode, and electrolyte material. The first electrode includes means for first electrode current collection, the first electrode current collection means being formed from a first conductive sheet, and a layer of first electrode material contacting a surface of the first conductive sheet. The second electrode includes means for second electrode current collection, the second electrode current collection means being formed from a second conductive sheet, and first and second layers of second electrode material contacting first and second surfaces of the second conductive sheet, the second electrode material is of a different potential than that of the first electrode material. The third electrode includes means for third electrode current collection, the third electrode current collection means being formed from a third conductive sheet, and a layer of third electrode material contacting a surface of the third conductive sheet, the third electrode material having the same potential as the first electrode material. Electrolyte material is disposed between the first and the second electrodes and disposed between the second and the third electrodes.

In accordance with still another aspect of the present invention, a battery module stack includes a plurality of multi-cell battery modules stacked on top of one another. Each multi-cell battery module comprises a first electrode including a first electrode tab extending from the first electrode, a second electrode including a second electrode tab extending from the second electrode, and a third electrode including a third electrode tab extending from the third electrode. The first electrode tab, the second electrode tab, and the third electrode tab extend from the multi-cell battery module such that the first electrode tab and the third electrode tab do not contact or electrically interfere with the second electrode tab. Means are provided for electrical connection of the first and third electrode tabs of the plurality of multi-cell battery modules. Means are provided for electrical connection of the second electrode tabs of the plurality of multi-cell battery modules.

In accordance with still another aspect of the present invention, a method of making a battery module stack is disclosed. One or more first and one or more second electrodes are stacked on top of one another such that first electrode material of the first electrodes faces second electrode material of the second electrodes and such that a layer of electrolyte material on the first electrodes separates the first electrode material and the second material. The first electrodes have first tabs. The second electrodes have second tabs. The first tabs are electrically connected. The second tabs are electrically connected.

BRIEF DESCRIPTION OF THE DRAWINGS

The present invention can be further understood with reference to the following description in conjunction with the appended drawings, wherein like elements are provided with the same reference numerals. In the drawings.

DESCRIPTION OF THE PREFERRED EMBODIMENT

Figure 1:
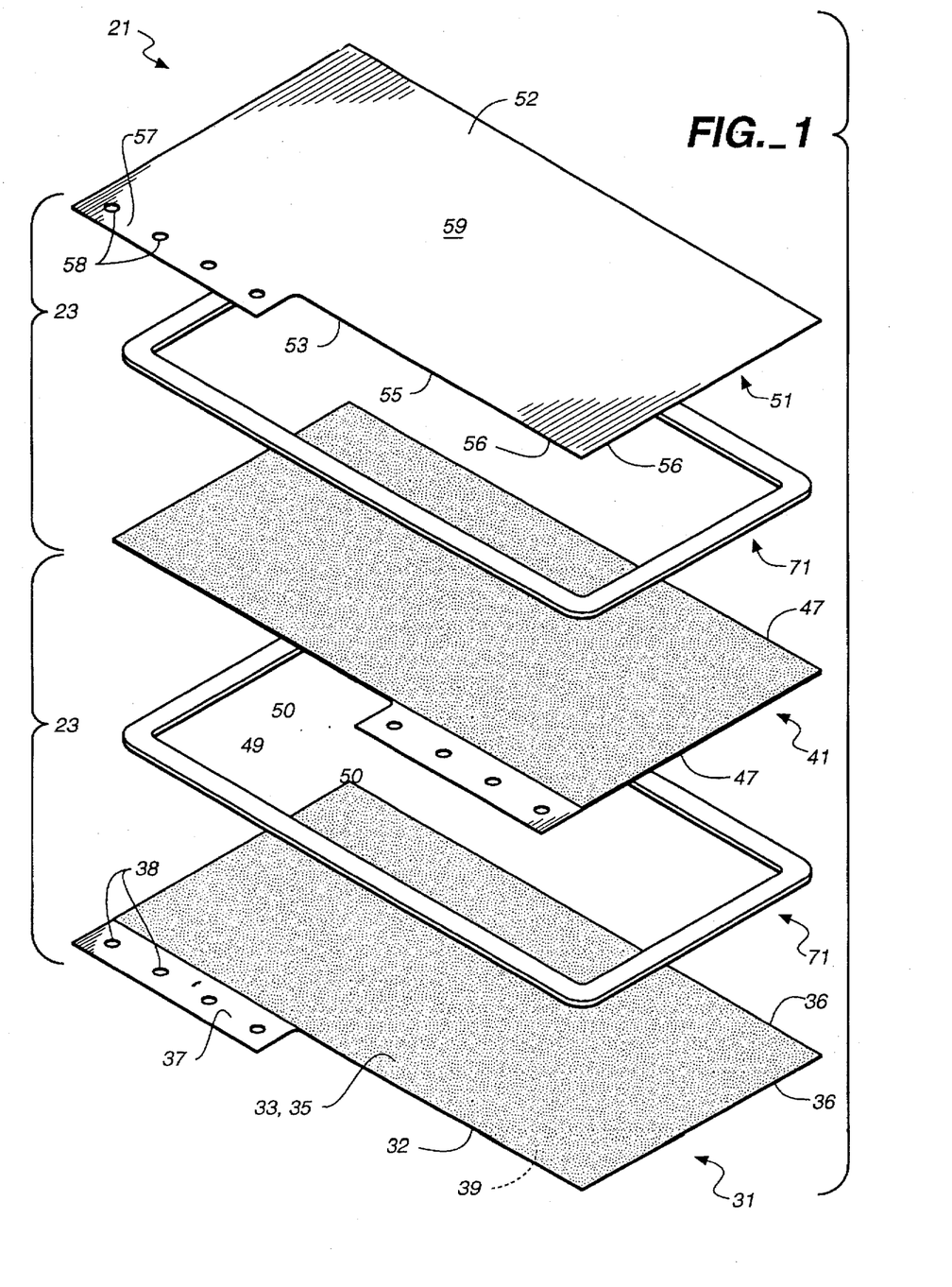
FIG. 1 is a schematic, exploded perspective view of a multi-cell battery according to an embodiment of the present invention.
Figure 2:
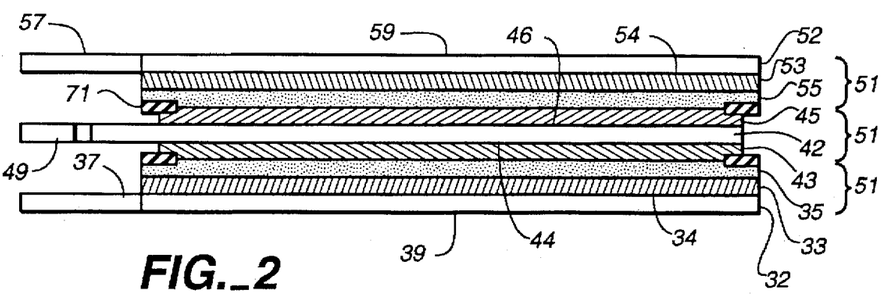
FIG. 2 is a schematic, side cross-sectional view of a multi-cell battery according to an embodiment of the present invention.

With reference to FIGS. 1 and 2, a multi-cell battery 21 includes a first electrode 31, a second electrode 41, and a third electrode 51. The first electrode 31 and the third electrode 51 are of the same potential as each other, and the second electrode 41 is of an different, or second, potential. The first electrode 31 faces a first layer of second potential electrode material 43 on the second electrode 41 to form a first electrochemical cell 22. The third electrode 51 faces a second layer of second potential electrode material 45 on the second electrode 41 to form a second electrochemical cell 23. The first and second electrochemical cells thus form a "multi-cell" battery. U.S. Pat. No. 4,925,751 to Shackle et al. describes certain anode, cathode, and polymer electrolyte materials useful in forming the multi-cell battery and is incorporated by reference only to the extent that it describes such materials.

In a preferred embodiment, the multi-cell battery 21 includes two electrochemical cells 22, 23 and is referred to as a "bicell" battery. For the remainder of this description, the multi-cell battery 21 will be referred to as a bicell battery in accordance with the preferred embodiment. However, it is understood that any number of electrochemical cells 22, 23 may be stacked on top of one another in the manner described herein to form a battery 21 with any number of individual cells.

In forming the first and third electrodes 31, 51, a layer of electrode material 33, 53 is applied in a predetermined thickness onto one surface 34, 54 of a conductive sheet 32, 52. A polymer electrolyte 35, 55 is then applied, in a layer of a predetermined thickness onto the layer of electrode material 33, 53.

The conductive sheets 32, 52 of the first and third electrodes 31, 51 are preferably formed from a web or sheet of conductive material. In a presently preferred embodiment, the conductive sheets 32, 52 are formed from a nickel or copper web or sheet. Electrode material for forming the layers of electrode material 33, 53 is applied to the web or sheet, such as by being extruded, and has a consistent, desired thickness. Polymer electrolyte material for forming the layers of electrolyte 35, 55 is applied to the electrode material, such as by being extruded, and has a consistent, desired thickness. The conductive web or sheet having layers of electrode material and electrolyte material is cut into desired shapes to form the first and third electrodes 31, 51. The electrode material 33, 53 is preferably a cathode material selected from the group of materials suited for storing ions released from an anode, with a vanadium oxide, $V_6O_{13}$ or $V_3O_8$, material being preferred.

The second electrode 41 includes a conductive sheet 42. A first layer 43 of electrode material, having an different potential to that of the layers of electrode material 33, 53 on the first and third electrodes 31, 51, is applied to a first side 44 of the conductive sheet 42. A second layer 45 of electrode material, also having an different potential to that of the layers of electrode material 33, 53 on the first and third electrodes 31, 51, is applied to a second side 46 of the conductive sheet 42.

As with the conductive sheets 32, 52, the conductive sheet 42 is preferably formed from a continuous conductive material, such as a nickel or copper web or sheet. The conductive sheet 42 is preferably cut in a desired shape from the web or sheet. The first and second layers of different, or second, potential electrode material 43, 45 are preferably an anode material, a lithium anode material being preferred. The first and second layers of different, or second, potential material 43, 45 are deposited to a desired thickness on the web for forming the conductive sheet 42.

In forming the bicell battery 21, the first electrode 31 and the second electrode 41 are position relative to one another such that the first layer of different, or second, potential electrode material 43 contacts the layer of electrolyte material 35 on the first electrode 31. The third electrode 51 and the second electrode 41 are positioned relative to one another such that the second layer of different, or second, potential electrode material 45 contacts the layer of electrolyte material 55 on the third electrode 51.

Substantially all of the surface area of the second electrode 41 is within the boundaries of the surface area of the first and third electrodes 31, 51 to prevent inadvertent contact between the edge 47 of the second electrode and the edges 36, 56 of the first and third electrodes. Contact between the edge 47 of the second electrode 41 and the edges 36, 56 of the first and third electrodes 31, 51 might result in shorting of the bicell battery 21.

To prevent inadvertent puncturing of the layers of electrolyte material 35, 55 on the first and third electrodes 31, 51 by the edge 47 or corners 48 of the second electrode 41, which might also result in shorting of the bicell battery 21, a means 71 for masking the edge and corners of the second electrode is provided. The masking means 71 frames the edge 47 and corners 48 of the second electrode 41 while allowing contact between the substantially all of the surface area of the first and second layers of different, second, potential electrode material 43, 45 and the electrode material 33, 53 of the first and third electrodes 31, 51, respectively. A preferred material for forming the masking means 71 is a polymeric material such as a porous polypropylene. The masking means 71 is generally quite thin, and only insignificant surface distortion of the first, second, or third electrodes 31, 41, or 51 occurs to accommodate the thickness of the masking means when the electrode surfaces contact with one another.

The first electrode 31 is provided with a conductive first electrode tab 37 extending from the first conductive sheet 32 to facilitate making an electrical connection between the first conductive sheet and an external load or power source. The first electrode tab 37 is preferably a portion of the first conductive sheet 32 that extends beyond a portion of the first conductive sheet to which electrode material 33 is applied. The second electrode 41 is provided with a second electrode tab 49 and the third electrode 51 is provided with a third electrode tab 57 in a similar manner.

Figure 5:
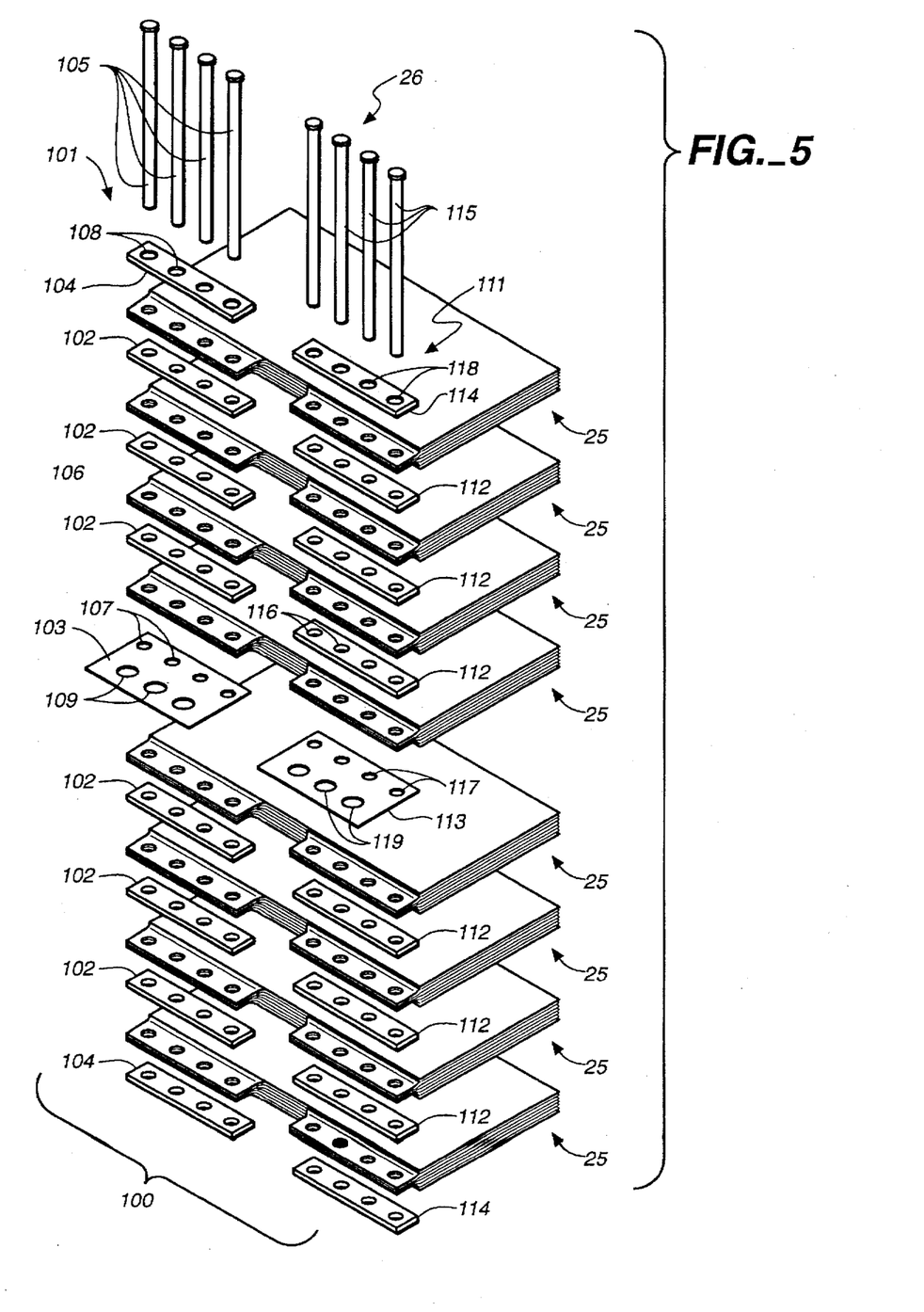
FIG. 5 is a schematic, exploded perspective view of a stack of groups of multi-cell batteries according to an embodiment of the present invention.
Figure 6:
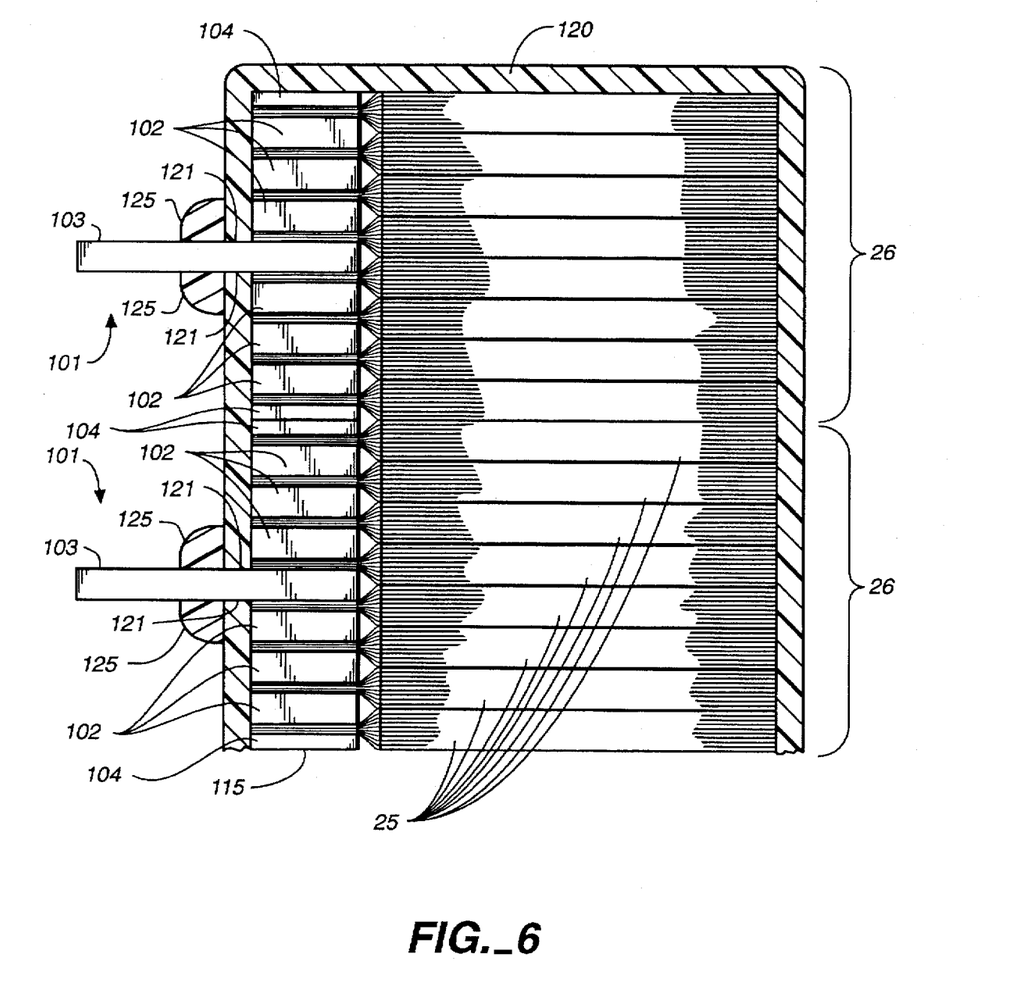
FIG. 6 is a schematic, side, partially cross-sectional view of two stacks of multi-cell batteries with electrically connected electrode tabs according to an embodiment of the present invention.
Figure 7:
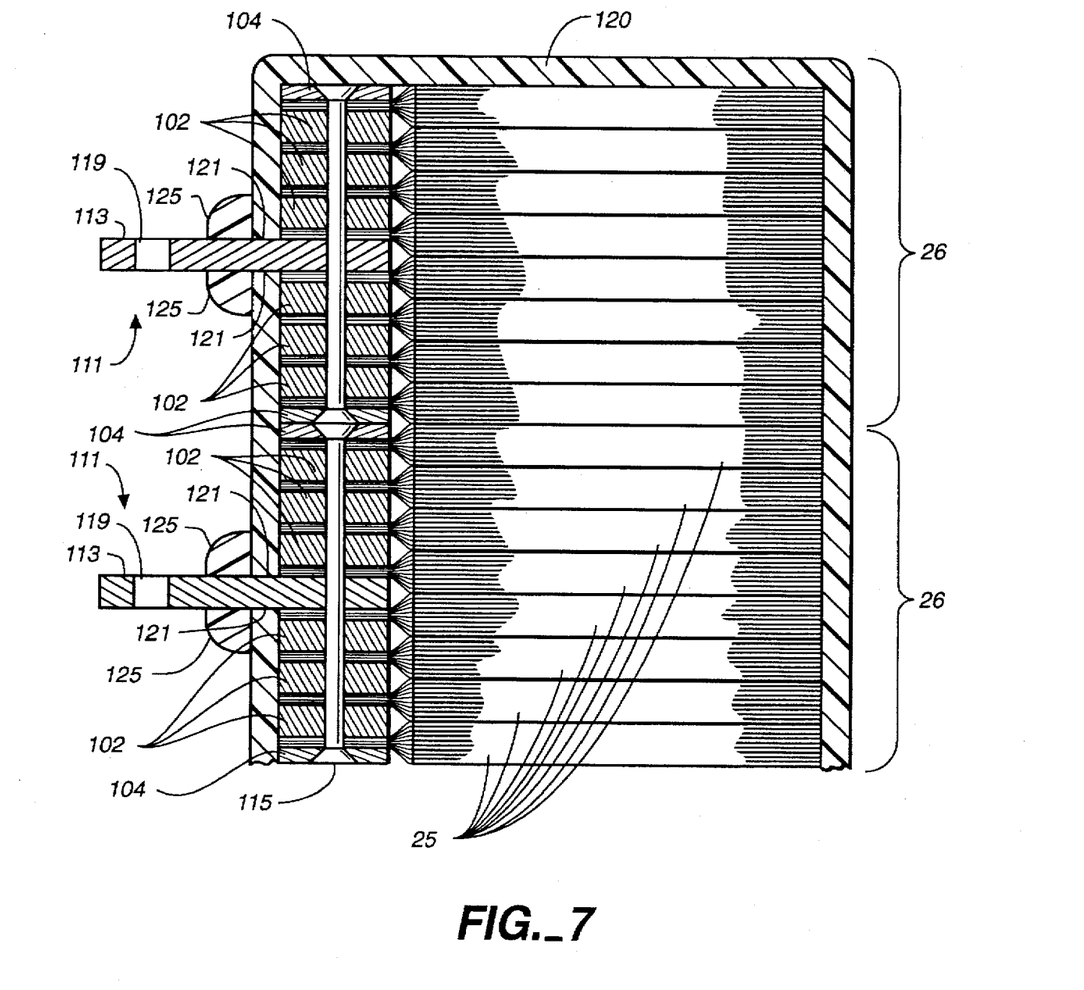
FIG. 7 is a schematic, side cross-sectional view of two stacks of multi-cell batteries with electrically connected electrode tabs according to an embodiment of the present invention.

The tabs 37, 49, 57 of the first, second, and third electrodes 31, 41, 51 are preferably portions of the conductive sheets 32, 42, 52 that are not coated with electrode material 33, 53 or different, or second, potential material 43, 45. As seen in FIGS. 3, 4, 5, and 7, the first electrode tab 37 and the third electrode tab 57 preferably extend from the first electrode 31 and the third electrode 51 such that, when the first electrode and the third electrode are positioned around the second electrode 41 to form a bicell battery 21, the first electrode tab and the third electrode tab are aligned substantially adjacent to one another over the height of the bicell battery. As seen in FIGS. 4 and 7, the aligned first electrode tab 37 and third electrode tab 57 are electrically connected to one another by being bent to contact one another. As seen in FIG. 6, the aligned second electrode tabs 49 are electrically connected to one another by being bent to contact one another.

Figure 3:
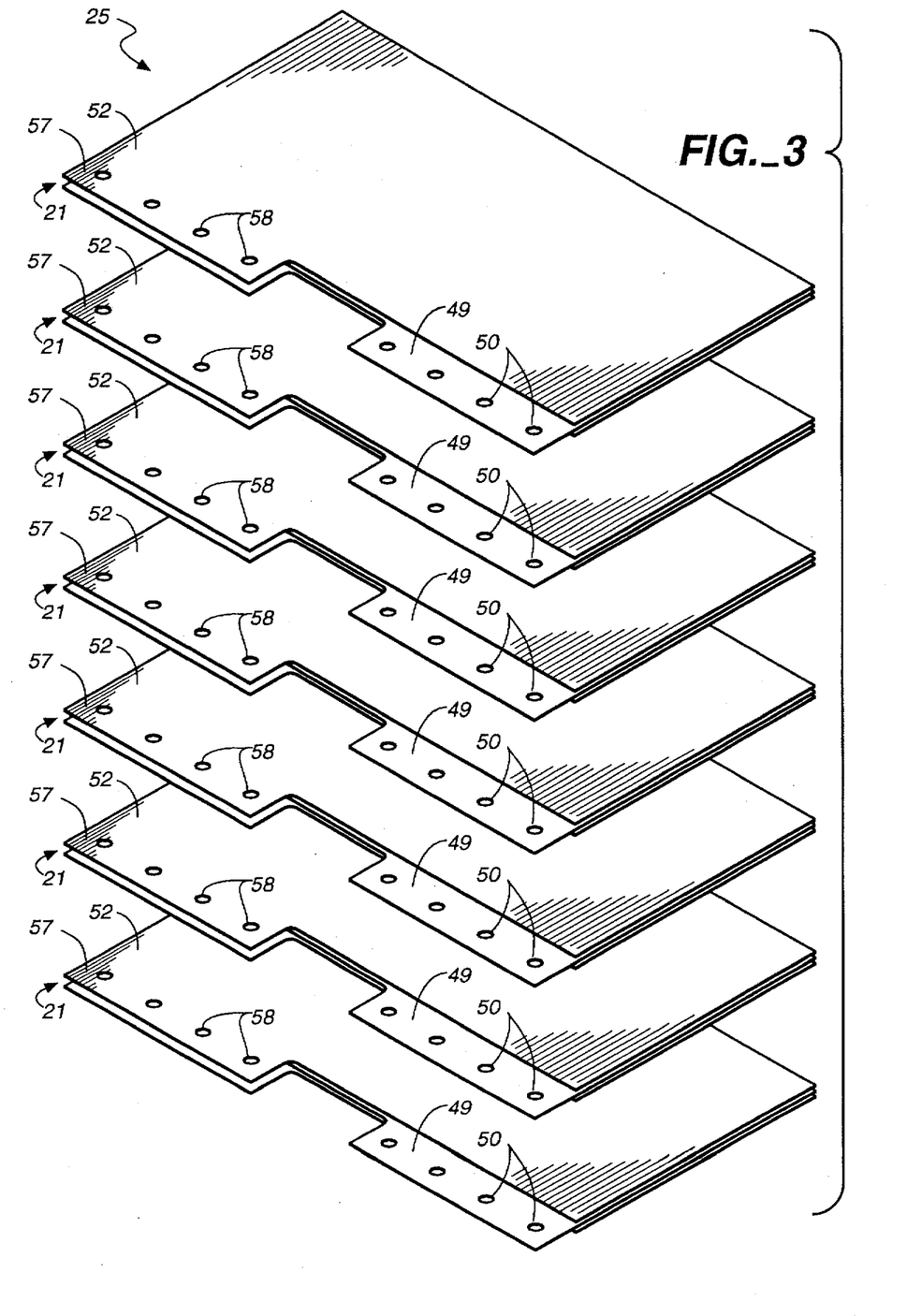
FIG. 3 is a schematic, exploded perspective view of a group of multi-cell batteries according to an embodiment of the present invention.
Figure 4:
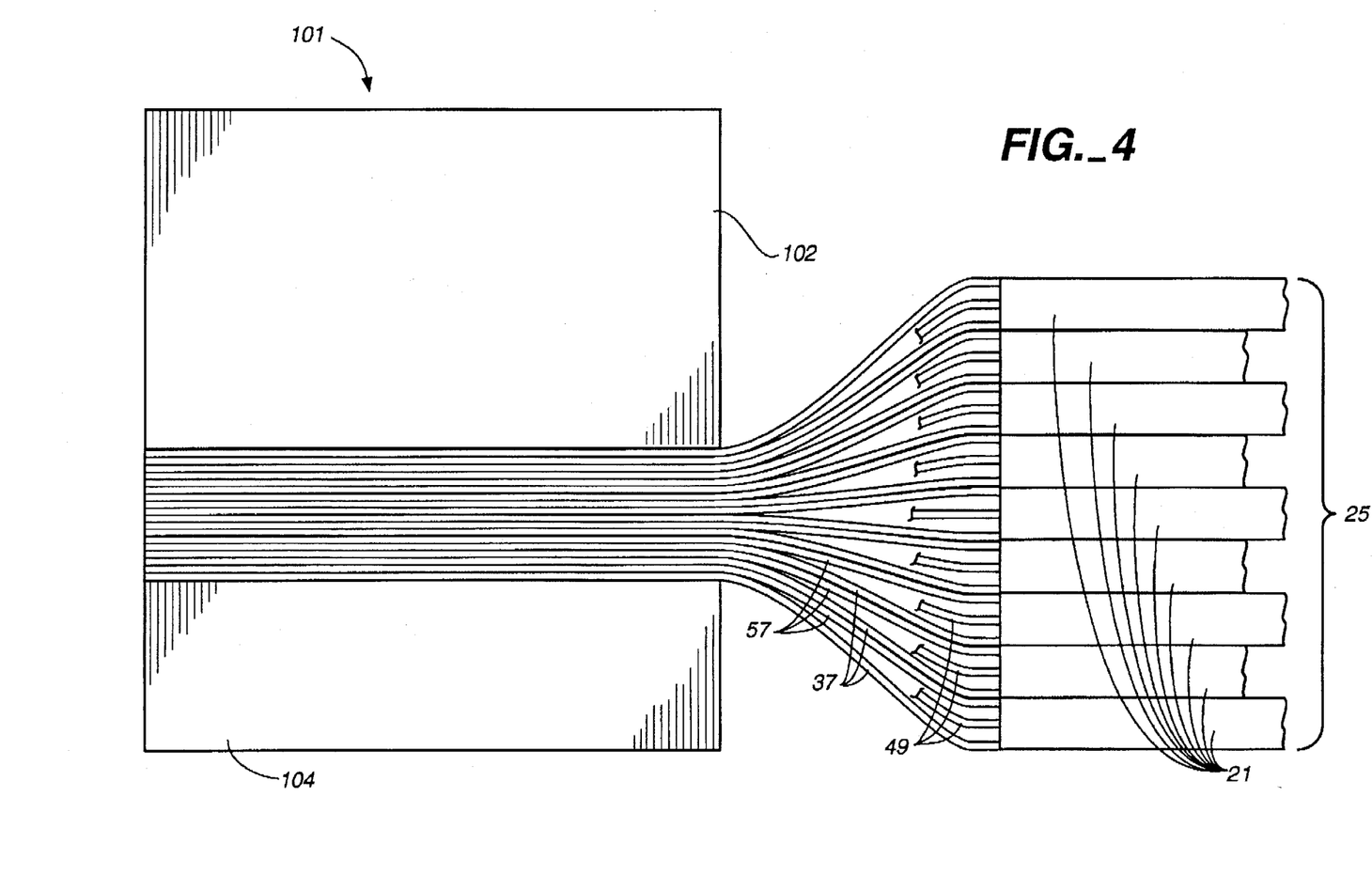
FIG. 4 is a schematic, side, partially cross-sectional view of a group of multi-cell batteries according to an embodiment of the present invention.

As seen in FIGS. 3 and 4, a desired number of bicell batteries 21 are stacked, one on top of another, to form a group 25 of bicell batteries. As seen in FIGS. 3 and 5, the second electrode tabs 49 extend from the second electrodes 41 such that, when the first electrodes and the third electrodes 51 are positioned around the second electrodes to form bicell batteries 21, the second electrode tabs are offset from and do not contact or otherwise electrically interfere with the first or third electrode tabs 37, 57. The second electrode tabs 49 of each of the second electrodes 41 are aligned relative to one another over the height of the battery along a single line offset from a line extending through the first and third electrode tabs 37, 57. The aligned second electrode tabs 49 are electrically connected by being bent to contact one another. When the plurality of bicell batteries 21 are stacked on top of one another, the non-coated side 59 of the third conductive sheet 52 of the third electrode 51 contacts with, and is thereby electrically connected to, the non-coated side 39 of the first conductive sheet 32 of a subsequent first electrode 31.

As noted above, in order for the second electrode tabs 49 of the plurality of bicell batteries 21 to contact one another, and in order for the first electrode tabs 37 and the third electrode tabs 57 of the plurality of bicell batteries to contact one another, because of the thickness of the various layers of material, some of the first electrode tabs, the second electrode tabs, and the third electrode tabs are bent to contact other tabs. As seen, for example, in FIG. 4, in a group 25 of bicell batteries 21, certain first and third electrode tabs 37, 57, generally on the outside of the group, are bent more than others. Similarly, as seen in FIG. 6, certain second electrode tabs 49, generally on the outside of the group 25, are bent more than others in endeavoring to electrically connect the second electrode tabs to one another.

Because the anode and cathode materials applied to the conductive sheets 32, 42, and 52 may tend, under some conditions, to de-laminate from the conductive sheets, and because of the possibility of breakage of electrode tabs 37, 49, 57, it is desirable to minimize the degree to which the electrode tabs are bent. Minimizing bending of the tabs 37, 49, 57 minimizes the danger of breakage of electrode tabs. To minimize the need to bend tabs 37, 49, 57, a group 25 preferably includes only approximately six or seven bicell batteries 21 so that the tabs in one group may be electrically connected to one another, and the bicell batteries are aligned with one another, in such a manner that no tab need be excessively bent to contact another tab in the group. By maintaining the number of bicell batteries 21 in a group 25 at approximately six or seven, it is not generally necessary to excessively bend any individual electrode tab 37, 49, 57 to electrically connect the tab with the other tabs in the group.

In addition to maintaining the size of a group 25 to a reasonable number of bicell batteries 21, conductive spacer means 100, seen in FIG. 5, are provided for aligning and electrically connecting the plurality of second electrode tabs 49 and for aligning and electrically connecting the plurality of first electrode tabs 37 and third electrode tabs 57 of one or more groups of bicell batteries in such a manner as to minimize any bending of the tabs 37, 49, 57. The spacer means 100 includes means for aligning and electrically connecting a desired number of first electrode tabs 37 and third electrode tabs 57, preferably an electrode spacer bar assembly 101, and means for aligning and electrically connecting a desired number of second electrode tabs 49 of groups 25 of bicell batteries 21, preferably an different, or second, potential electrode spacer bar assembly 111.

As seen in FIGS. 4 and 7, bending of the first electrode tabs 37 and the third electrode tabs 57 of a group 25 of bicell batteries 21 is minimized and the tabs are electrically connected to one another by being clamped together in the electrode spacer bar assembly 101. As seen in FIGS. 5 and 7, the electrode spacer bar assembly 101 includes a desired number of electrode spacers 102, an electrode terminal 103 for electrically connecting the electrode spacer bar assembly to an outside load or power source, a pair of electrode spacer bar assembly end plates 104, and a fastening means such as shafts 105 with increased diameter caps or ends 105' for holding the electrode spacer bar assembly together. The ends 105' may be part of the shaft 105 or separate elements secured thereto. For example, the shaft 105 may be a rivet that is deformed to form each of the ends 105', or the shaft may be provided with any other suitable, separate fastening means, such as a bolt and nut arrangement, or other suitable fastener. The electrode spacer bar assembly end plates 104 sandwich the electrode spacers 102 and the electrode terminal 103 when the shaft 105 with ends 105' fastens the electrode spacer bar assembly 101 together around the tabs 37, 57.

As seen in FIGS. 4, 5, and 7, the first electrode tabs 37 and the third electrode tabs 57 of each group 25 of bicell batteries 21 are clamped between either two electrode spacers 102, an electrode spacer and an electrode terminal 103, an electrode spacer and an electrode spacer bar assembly end plate 104, or an electrode terminal and an electrode spacer bar assembly end plate. The electrode spacers 102, the electrode terminal 103, and the electrode spacer bar assembly end plates 104, as well as the first and third electrode tabs 37, 57 of groups 25 of bicell batteries 21, are fastened together by the shaft 105, seen in FIGS. 5 and 7, and its ends 105'. The thicknesses of individual ones of the electrode spacer bars 102, electrode terminals 103, and electrode spacer bar assembly end plates 104, and the number of bicell batteries 21 constituting a group 25, are preferably selected such that any bending of the first electrode tabs 37 or third electrode tabs 57 for being clamped by the electrode spacer bar assembly 101 presents little danger of delamination of electrode material 33, 53 or of breakage of electrode tabs.

As seen in FIGS. 5 and 6, an different, or second, potential electrode spacer bar assembly 111, including different, or second, potential electrode spacers 112 and an different, or second, potential electrode terminal 113 fastened between two different, or second, potential electrode spacer bar assembly end plates 114 by fastening means such as shafts 115 with increased diameter caps or ends 115', seen in FIG. 5, is provided for electrically connecting the second electrode tabs 49 of groups 25 of bicell batteries 21 in the same or a similar fashion as the electrode spacer bar assembly 101 electrically connects the first and third electrode tabs 37, 57. As noted above, the second electrode tabs 49 are offset from and do not contact or otherwise electrically interfere with the first and third electrode tabs 37, 57. The electrode spacer bar assembly 101 is also offset from and does not contact or otherwise electrically interfere with the second electrode tabs 49. Similarly, the different, or second, potential electrode spacer bar assembly 111 is offset from and does not contact or otherwise electrically interfere with the first and third electrode tabs 37, 57 or the electrode spacer bar assembly 101.

Similar to the elements of the electrode spacer bar assembly 101, the thickness of individual ones of the different, or second, potential electrode spacer bars 112, different, or second, potential electrode terminals 113, and different, or second, potential electrode spacer bar assembly end plates 114, and the number of bicell batteries 21 constituting a group 25, are preferably selected such that any bending of the second electrode tabs 49 for being clamped by the different, or second, potential electrode spacer bar assembly 111 presents little danger of delamination of different, or second, potential electrode material 43, 45 or breakage of second electrode tabs 49. In a preferred embodiment, the same number of electrode spacer bars 102 are used as the number of different, or second, potential electrode spacer bars 112. However, if desired, different numbers of electrode spacer bars 102 than different, or second, potential electrode spacer bars 112 may be used, and different numbers of second electrode tabs 49 may be clamped between different, or second, potential electrode spacer bars, different, or second, potential electrode terminals 113, and different, or second, potential electrode spacer bar assembly end plates 114 than first and third electrodes that are clamped between corresponding members of the electrode spacer bar assembly 101.

In addition to clamping together the first and third electrode tabs 37, 57 of groups of bicell batteries and clamping together the second electrode tabs 49 of groups 25 of bicell batteries, the electrode spacer bar assembly 101 and the different, or second, potential electrode spacer bar assembly 111 facilitate proper alignment of the tabs. Considering, first, the alignment of the first and third electrode tabs 37, 57, as seen in FIGS. 1 and 3, the first electrode tabs are preferably formed with holes 38 and the third electrode tabs are preferably formed with holes 58. The holes 38 and 58 of a plurality of bicell batteries 21 are aligned relative to one another by being stacked on top of one another over the shafts 105. Similarly, as seen in FIG. 5, the electrode spacer bars 102 are preferably formed with holes 106, the electrode terminal is preferably formed with holes 107, and the electrode spacer bar assembly end plates 104 are preferably formed with holes 108 to facilitate being aligned relative to one another, as well as to the first and third electrode tabs 37, 57, by being stacked over the shafts 105.

Similarly, as seen in FIGS. 1 and 3, the second electrode tabs 49 are preferably formed with holes 50. The holes 50 of a plurality of bicell batteries 21 are aligned relative to one another by being stacked on top of one another over the shafts 115. As seen in FIG. 5, the different, or second, potential electrode spacer bars 112 are preferably formed with holes 116, the different, or second, potential electrode terminal 113 is preferably formed with holes 117, and the different, or second, potential electrode spacer bar end plates 114 are preferably formed with holes 118 to facilitate being aligned relative to one another, as well as to the second electrode tabs 49, by being stacked over the shafts 115. The electrode terminal 103 is preferably formed with additional holes 109 and the different, or second, potential electrode terminal 113 is preferably formed with additional holes 119 to facilitate making external connections with power sources or loads.

The thickness of the electrode spacer bar assembly 101 plus the thickness of a plurality of clamped first electrode tabs 37 and third electrode tabs 57 of a plurality of bicell batteries 21 is preferably substantially the same as the thickness of the bicell batteries. Similarly, the thickness of the different, or second potential electrode spacer bar assembly 111 plus the thickness of a plurality of clamped second electrode tabs 49 of the plurality bicell batteries 21 is preferably substantially the same as the thickness of a plurality of bicell batteries. It is preferred to form the electrode spacer bar assembly 101 and the different, or second, potential electrode spacer bar assembly 111 in such thicknesses so that a stack 26 of groups 25 of a plurality of bicell batteries 21 and the spacer means 100 is a substantially constant thickness.

The stack 26 of bicell batteries 21 may be assembled by inserting fastening means such as shafts 105 through holes 108 in an electrode spacer bar assembly end plate 104 and inserting fastening means such as shafts 115 through holes 118 in an different, or second, potential electrode spacer bar assembly end plate 114. First electrodes 31, second electrodes 41, and third electrodes 51 are then layered on top of one another, the shafts 105 are inserted through the holes 38, 58, and the shafts 115 are inserted through the holes 50 until a desired number of bicell batteries 21 form a group 25. If desired, the masking means 71 may be provided between the first electrode 31 and the second electrode 41 and between the second electrode and the third electrode 51.

The shafts 105 are then inserted through the holes 106 of an electrode spacer bar 102 so that the electrode spacer bar and the electrode spacer bar assembly end plate 104 sandwich the first electrode tabs 37 and the third electrode tabs 57 of the group 25 of bicell batteries 21. The shafts 115 are inserted through the holes 116 of an different, or second, potential electrode spacer bar 112 so that the different, or second, potential electrode spacer bar and the different, or second, potential spacer bar assembly end plate 114 sandwich the second electrode tabs 49 of the group 25 of bicell batteries 21. Additional groups 25 of bicell batteries 21 of the same or varying numbers of bicell batteries and additional spacer bars 102, 112 may be attached to the shafts 105, 115 in the same fashion.

The shafts 105, 115 are inserted through holes 107, 117, respectively, of the electrode terminal 103 and the different, or second, potential electrode terminal 113. Normally, the electrode terminal 103 and the different, or second potential electrode terminal 113 are applied to the assembly so that they project from a center of the stack 26 of bicell batteries 21. After a desired number of groups 25 of bicell batteries 21, spacer bars 102, 112, and terminals 103, 113 are connected, the shafts 105 are inserted through the holes 108 in another electrode spacer bar assembly end plate 104, the shafts 115 are inserted through the holes 118 in another different or second, potential electrode spacer bar assembly end plate 114. The shafts 105, 115 are secured to the stacks 26 by the ends 105', 115' and fasten together the electrode spacer bar assembly 101, the first electrodes 31, and the third electrodes 51 and fasten together the different, or second, potential electrode spacer bar assembly 111 and the second electrodes 41 such as by deforming the shafts to form increased diameter ends or by attaching nuts or caps to threaded portions of the shafts to form ends.

Figure 8:
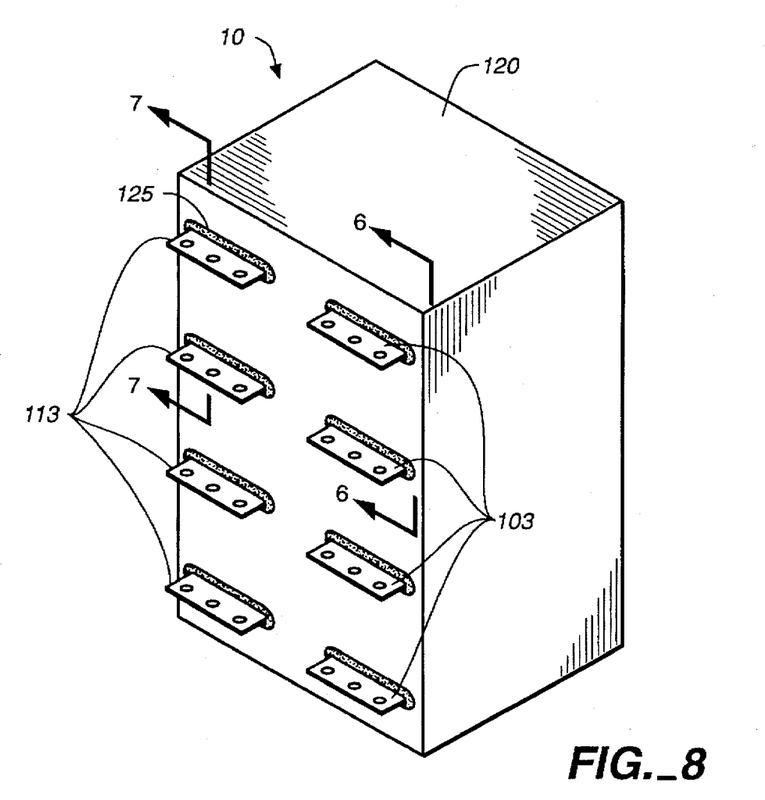
FIG. 8 is a schematic perspective view of several stacks of multi-cell batteries enclosed in an insulating wrapping according to an embodiment of the present invention.

As shown in FIGS. 6-8, more than one stack 26 may be electrically connected to form a multi-stack battery 10 having more power than a single stack. Multiple stacks 26 are stacked on top of one another to such that an electrode spacer bar assembly endplate 104 of a first stack contacts an electrode spacer bar assembly endplate of a subsequent stack and an different, or second, potential electrode spacer bar assembly endplate 114 of the first stack contacts an different, or second, potential electrode spacer bar assembly endplate 114 of the subsequent stack, thereby electrically connecting the stacks. Wiring or other suitable means for electrically connecting the terminals 103, 113 of multiple stacks 26 of bicell batteries 21 may also be provided to electrically connect the stacks.

As seen in FIGS. 6, 7, and 8, after a stack 26 of bicell batteries 21, or a multi-stack battery 10, has been formed as described above, a means 120 for enclosing the stack is provided around the stack. Preferably, the enclosing means 120 includes a non-conductive, heat-sealable plastic wrap material that is wrapped around the stack 26 and is heat-sealed around the stack such that the stack is insulated. The enclosing means 120 may also be used to secure the various components of the stack 26 together. At least a portion of an electrode terminal 103 and a portion of an different, or second, potential electrode terminal 113 extend out of the enclosing means 120(which is sealed at its edges). Alternatively, conductive means such as wiring (not shown) for electrically connecting the terminals 103, 113 extends from the enclosing means 120, and the terminals 103, 113 are sealed inside the enclosing means. Sealing means 125, such as a hot-melt adhesive, is applied around edges 121 of the wrapped material around the electrode terminals 103 and the different, or second, potential electrode terminals 113, or conductive means (not shown) connecting those terminals, to ensure that the stack 26 is well sealed.

The stack 26 is manufactured by a method wherein the first electrode 31, the second electrode 41, and the third electrode 51 are stacked on top of one another such that the electrode material 33, 53 of the first and third electrodes faces the different, or second, potential electrode material 43, 45 on the second electrode. The first electrode 31, the second electrode 41, and the third electrode 51 are stacked such that the electrolyte material layer 35 on the first electrode separates the electrode material layer 33 on the first electrode and the layer of different, or second, potential electrode material 43 on the first surface 44 of the conductive sheet 42 and such that the electrolyte material layer 55 on the third electrode separates the electrode material layer 53 on the third electrode and the layer of different, or second, potential electrode material 45 on the second surface 46 of the conductive sheet. The first electrode tabs 31 and the third electrode tabs 57 are electrically connected to one another by the electrode spacer bar assembly 101. The second electrode tabs 49 are electrically connected to one another by the different, or second, potential electrode spacer bar assembly 111.

The first and third electrode tabs 37, 57 are clamped between sets of electrode spacer bars 102, electrode terminals 103, or electrode spacer bar assembly endplates 104, and the second electrode tabs 49 are clamped between sets of different, or second, potential electrode spacer bars 112, different, or second, potential electrode terminals 113, or different, or second potential electrode spacer bar assembly endplates 114. Preferably, the first and third electrode tabs 37, 57 are fastened in position relative to the electrode spacers 102, the electrode terminal 103, and the electrode spacer bar assembly end plates 104 with shafts 105 having ends 105'; and, preferably, the second electrode tabs 49 are fastened in position relative to the different, or second potential electrode spacers 112, the different, or second potential electrode terminals 113, and the different, or second potential electrode spacer bar assembly end plates 114 with shafts 115 having ends 115'. Holes 38, 58, 106, 107, and 108 are preferably formed in, respectively, the first electrode tabs 37, the third electrode tabs 57, the electrode spacer bars 102, the electrode terminal 103, and the electrode spacer bar assembly end plates 104, and holes 50, 116, 117, and 118 are preferably formed in, respectively, the second electrode tabs 49, the different, or second, potential electrode spacer bar 112, the different, or second, potential electrode terminal 113, and the different, or second, potential electrode spacer bar assembly end plates 114 before fastening with shafts 105, 115.

The various components of the stack 26 with the above-noted holes may be stacked on top of another in such a manner that the shafts 105, 115 act as a guide for properly aligning the components. Alternatively, the shafts 105, 115 fasten together components that have been pre-aligned, such as by stacking the components in a form of a shape corresponding to the shape of the components, and form the above-noted holes while the fastening is taking place.

The bicell batteries 21 have thus far been described with reference to first and third electrodes 31, 51 including polymer electrolyte layers 35, 55 on electrode material layers 33, 53. It is, however, possible to form polymer electrolyte layers on the different, or second, potential electrode material layers 43, 45 on the opposite polarity electrode 41, instead of on the electrode material layers 33, 53.

The bicell batteries 21 have also, thus far, been described with reference to first and third electrodes 31, 51 being larger in surface area than a second electrode 41, such that substantially all of the surface area of the second electrode is bound by the first and third electrodes. It is, however, possible to form second electrodes 41 that are larger in surface area than first and third electrodes 31, 51, such that substantially all of the surface area of the first and third electrodes is bounded by the second electrodes. Similarly, masking means 71 may be provided around the edges of the first and third electrodes 31, 51 to avoid contact of the electrode material 33, 53 with the different, or second, potential electrode material 43, 45.

Further, the bicell batteries 21 have been described, thus far, with reference to first and third electrode tabs 37, 57 that are aligned with each other such that they are clamped together in an electrode spacer bar assembly 101. It is also possible to form first and third electrode tabs 37, 57 that do not align with one another in a bicell battery 21. One electrode spacer bar assembly may be provided for clamping and electrically connecting all of the first electrode tabs 37 and another electrode spacer bar assembly may be provided for clamping and electrically connecting all of the third electrode tabs 57. The two electrode spacer bar assemblies may then be electrically connected to one another.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A laminar electrochemical cell having an anode that includes an anode current collector and a layer of anode material that is applied on a surface of the anode current collector, a cathode that includes a cathode collector and a layer of cathode material that is applied on a surface of the cathode current collector, and a polymer electrolyte that is interposed between the anode and cathode with said polymer electrolyte being in contact with a surface of the anode material and with a surface of the cathode material, wherein the improvement comprises means for masking at least a portion of the outer periphery of the anode material sufficient to prevent electrical contact of the anode material to the cathode material.

2. The electrochemical cell of claim 1 wherein an outer periphery of the cathode is larger than an outer periphery of the anode such that substantially all of the outer periphery of the anode is bounded by the outer periphery of the cathode.

3. The electrochemical cell of claim 1, further comprising a first electrode tab that extends from the cathode current collector.

4. The electrochemical cell of claim 3, further comprising a second electrode tab that extends from the anode current collector, the first electrode tab and the second electrode tab extending from the electrochemical cell and out of contact with one another.

5. The electrochemical cell of claim 1, wherein the anode material comprises lithium.

6. The electrochemical cell of claim 1, wherein the cathode material comprises vanadium oxide.

7. The electrochemical cell of claim 1, wherein the masking means comprises a polymeric material.

8. The electrochemical cell of claim 7, wherein the polymeric material is polypropylene.

9. The electrochemical cell of claim 7, wherein the masking means comprises a mask that is positioned between the polymer electrolyte and the anode material.

10. The electrochemical cell of claim 2, wherein the masking means comprises a mask that is positioned between the polymer electrolyte and the anode material.

* * * * *